US008128317B2

(12) United States Patent
Lourenco et al.

(10) Patent No.: US 8,128,317 B2
(45) Date of Patent: Mar. 6, 2012

(54) METHOD OF INCREASING STORAGE CAPACITY OF NATURAL GAS STORAGE CAVERNS

(76) Inventors: Jose Lourenco, Edmonton (CA); Mackenzie Millar, Edmonton (CA)

( * ) Notice: Subject to any disclaimer, the term of this patent is extended or adjusted under 35 U.S.C. 154(b) by 300 days.

(21) Appl. No.: 12/303,712

(22) PCT Filed: Jun. 6, 2007

(86) PCT No.: PCT/CA2007/000947

§ 371 (c)(1),
(2), (4) Date: Dec. 5, 2008

(87) PCT Pub. No.: WO2007/140581

PCT Pub. Date: Dec. 13, 2007

(65) Prior Publication Data

US 2010/0189508 A1 Jul. 29, 2010

(51) Int. Cl.
*B65G 5/00* (2006.01)
*F25J 1/00* (2006.01)

(52) U.S. Cl. ................ 405/53; 62/53.1; 62/611; 62/657

(58) Field of Classification Search .................... 405/52, 405/53, 59; 62/606, 611, 121, 53.1, 657
See application file for complete search history.

(56) References Cited

U.S. PATENT DOCUMENTS

| | | | | | |
|---|---|---|---|---|---|
| 3,280,575 | A | * | 10/1966 | Drake | 62/48.2 |
| 3,477,509 | A | * | 11/1969 | Arendt | 166/252.1 |
| 3,747,359 | A | * | 7/1973 | Streich | 62/623 |
| 3,792,590 | A | * | 2/1974 | Lofredo et al. | 62/614 |
| 3,919,853 | A | * | 11/1975 | Rojey | 62/625 |
| 3,962,881 | A | * | 6/1976 | Muska | 62/606 |
| 5,511,905 | A | * | 4/1996 | Bishop et al. | 405/59 |
| 6,517,286 | B1 | | 2/2003 | Latchem | |
| 6,848,502 | B2 | * | 2/2005 | Bishop et al. | 165/154 |
| 6,932,121 | B1 | | 8/2005 | Shivers, III | |
| 2003/0051875 | A1 | | 3/2003 | Wilson | |
| 2009/0010717 | A1 | * | 1/2009 | Horton et al. | 405/210 |
| 2010/0175884 | A1 | * | 7/2010 | Poldervaart et al. | 166/352 |

FOREIGN PATENT DOCUMENTS

| | | | |
|---|---|---|---|
| CA | 2318802 | A1 | 8/1999 |
| CA | 2467338 | A1 | 7/2003 |
| RU | 2232342 | C1 | 7/2004 |

* cited by examiner

*Primary Examiner* — Tara Mayo-Pinnock
(74) *Attorney, Agent, or Firm* — Christensen O'Connor Johnson Kindness PLLC

(57) ABSTRACT

A method of increasing the storage capacity of a natural gas storage cavern involves the step of adding liquefied natural gas to gaseous natural gas in the natural gas storage cavern. The addition of liquefied natural gas serves to reduce the temperature and associated pressure of gaseous natural gas in the natural gas storage cavern, thereby increasing the capacity of the natural gas storage cavern.

2 Claims, 1 Drawing Sheet

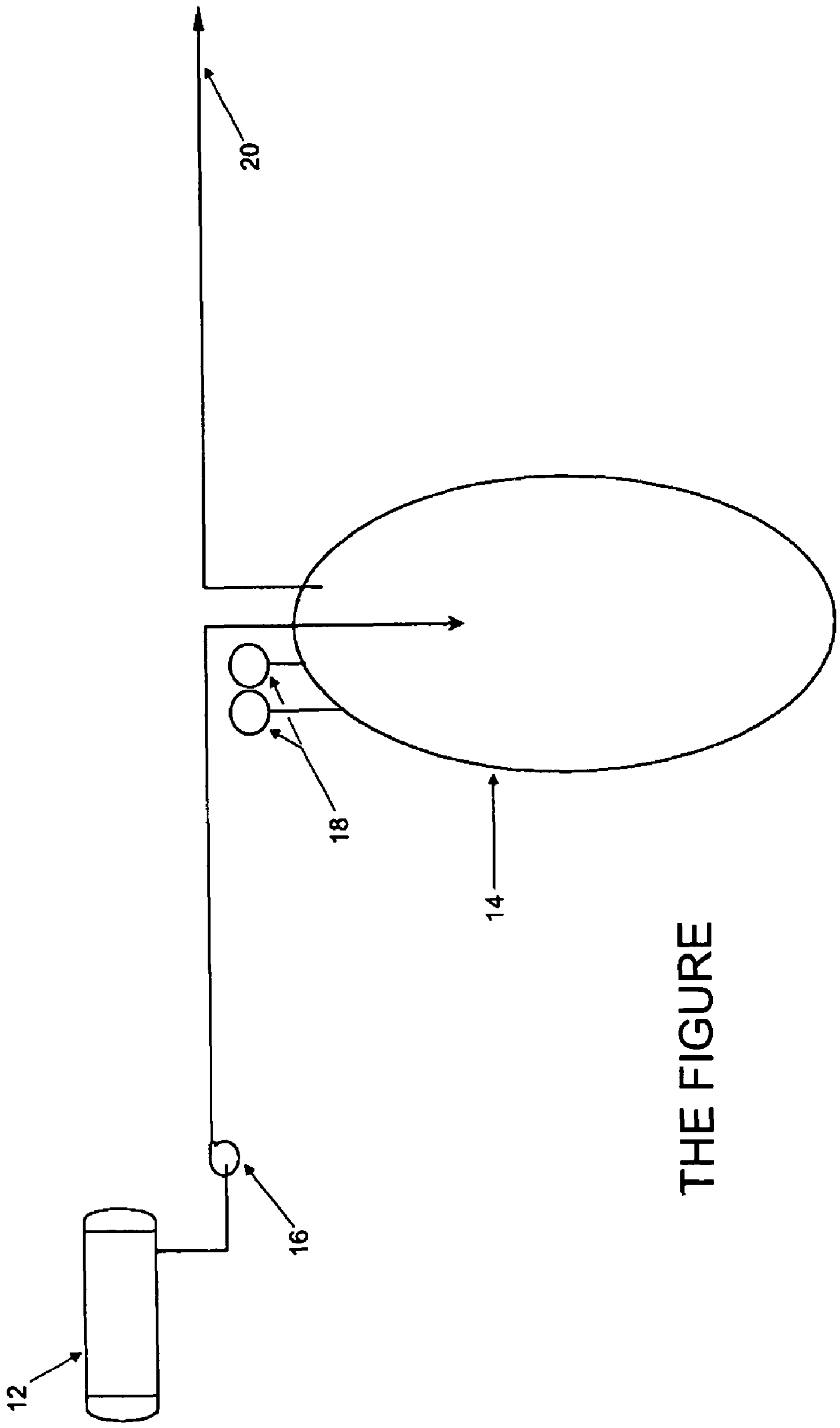
THE FIGURE

METHOD OF INCREASING STORAGE CAPACITY OF NATURAL GAS STORAGE CAVERNS

FIELD OF THE INVENTION

The present invention relates to a method of increasing the storage capacity of natural gas storage caverns.

BACKGROUND OF THE INVENTION

Natural gas is traditionally stored in a gaseous form in large volume salt caverns and aquifers to meet peak demand and ensure a secure supply. The gas is added by compression, resulting in an increment in cavern temperature and an associated increment in cavern pressure. These increments in pressure and temperature increase compression costs and reduce cavern capacity. The typical operating conditions at these caverns are at pressures greater than 2000 psig and temperatures of ~100° C. The actual pressure and temperature is dependent on its mode of operation.

SUMMARY OF THE INVENTION

A method of increasing the storage capacity of a natural gas storage cavern involves the step of adding liquefied natural gas to gaseous natural gas in the natural gas storage cavern. The addition of liquefied natural gas serves to reduce the temperature and associated pressure of gaseous natural gas in the natural gas storage cavern, thereby increasing the capacity of the natural gas storage cavern.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

THE FIGURE is a schematic diagram of a natural gas storage cavern illustrating the method of increasing the storage capacity of natural gas storage caverns.

DETAILED DESCRIPTION OF THE PREFERRED EMBODIMENT

The method will now be described with reference to THE FIGURE.

Liquefied Natural Gas (LNG) is stored at −160° C. at atmospheric pressure in insulated cryogenic tanks 12. Gaseous natural gas is stored in a cavern 14 at operating conditions that are typically about 2000 psig and 100° C. The basic process involves adding liquefied natural gas from a cryogenic tank 12 to gaseous natural gas in cavern 14. For this purpose, a pump 16 is used that is a cryogenic high pressure reciprocating pump. LNG is preferably added by pump 16 at a controlled flow rate to achieve a desired reduction in cavern temperature to increase cavern capacity. The mixing of the colder LNG at the point of discharge with the stored warmer gas will preferentially be at the center of the cavern for better distribution and heat transfer. Cavern pressure and temperature sensors, generally identified by reference numeral 18, monitor the result of the flow LNG into cavern 14. The operation of pump 16 is controlled based upon monitored feedback from sensors 18. The LNG gives up its cold to the natural gas within cavern 14. The lowering of the temperature of the natural gas increases the gas storage capacity of cavern 14.

Heat from the ground surrounding cavern 14 will allow the gas to expand with time, thus resulting in an incremental increase in pressure within cavern 14 over time. This is because pressure increases proportionally to temperature, moreover the volume changes 600 fold from the original pumped liquid phase to its present gaseous phase. This facilitates self pressurization within cavern 14 when it is desired to extract gas from cavern 14 and send it to natural gas distribution, generally indicated by reference numeral 20.

A further benefit is obtained through a reduction in compression costs. It is less costly to input LNG by means of a pump than it is to insert more gaseous form natural gas into cavern 14 that is already at 2000 psig using a compressor. In addition, the lowering of temperature and pressure with LNG also results in a reduction in compression costs when more gaseous form natural gas is being inserted into cavern 14 which is now at a lower temperature and a lower pressure.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of increasing the storage capacity of a natural gas storage cavern, the method comprising:

using sensors in communication with gaseous natural gas in a natural gas storage cavern to monitor at least one of pressure or temperature in the natural gas storage cavern;

using a cryogenic high pressure pump to add selected quantities of liquefied natural gas to gaseous natural gas in the natural gas storage cavern based upon feedback from the sensors to maintain at least one of the pressure or the temperature of the gaseous natural gas within the natural gas storage cavern at a pre-selected level pursuant to a control strategy in which a reduction of the temperature and associated pressure of the gaseous natural gas in the natural gas storage cavern is effected for the express purpose of increasing the storage capacity of the natural gas storage cavern, while maintaining the natural gas in a gaseous state and the temperature within the thermo-elastic limits of the natural gas storage cavern.

2. The method of claim 1, further including a step of having a discharge point for the liquefied natural gas pumped by the cryogenic high pressure pump positioned at a center of the natural gas storage cavern.

* * * * *